United States Patent [19]
Estelle et al.

[11] Patent Number: 5,473,473
[45] Date of Patent: Dec. 5, 1995

[54] TWO ELEMENT PLASTIC ZOOM CAMERA LENS

[75] Inventors: Lee R. Estelle; Alan E. Lewis, both of Rochester, N.Y.

[73] Assignee: Eastman Kodak Company, Rochester, N.Y.

[21] Appl. No.: 170,943

[22] Filed: Dec. 20, 1993

[51] Int. Cl.$^6$ ..................................................... G02B 15/14
[52] U.S. Cl. .......................................... 359/691; 359/692
[58] Field of Search ..................................... 359/691, 692, 359/738

[56] References Cited

U.S. PATENT DOCUMENTS

| | | | |
|---|---|---|---|
| 4,932,764 | 6/1990 | Simpson | 350/441 |
| 4,936,661 | 6/1990 | Betensky et al. | 350/423 |
| 5,071,235 | 12/1991 | Mori et al. | 359/692 |
| 5,087,988 | 2/1992 | Nakayama | 359/689 |
| 5,270,861 | 12/1993 | Estelle | 359/692 |
| 5,270,867 | 12/1993 | Estelle | 359/692 |
| 5,381,269 | 1/1995 | Estelle | 359/691 |

FOREIGN PATENT DOCUMENTS 5-281471  10/1993  Japan ...................................... 359/692

*Primary Examiner*—Georgia Y. Epps
*Assistant Examiner*—Michael A. Papalas
*Attorney, Agent, or Firm*—Leonard W. Treash, Jr.

[57] ABSTRACT

A zoom camera lens for an inexpensive camera, for example, a single use camera, has two plastic elements including a positive element and a negative element and a stop. Each of the surfaces of each of the elements is concave to the stop. Preferably, the lens has a curved image plane.

18 Claims, 1 Drawing Sheet

TWO ELEMENT PLASTIC ZOOM CAMERA LENS

This invention relates to an inexpensive zoom camera lens. Although not limited thereto, it is particularly usable as a zoom lens for a single use camera.

Single use cameras have become recently popular. They allow a purchaser, who does not have a more expensive camera but has a temporary desire to take pictures, to purchase a camera already loaded with film. The camera is returned to the photofinisher for unloading of the film and its processing. The photofinisher returns the camera to the manufacturer for recycling and the pictures to the customer. Although these cameras started out as the most simple of types, they have gradually become more complicated with the addition of flash, underwater and panoramic capabilities.

At the same time, zoom lenses, originally used for motion picture and video cameras have worked their way into still cameras. Although they started first with more expensive SLR's, they are now available on "viewfinder" 35 mm cameras of relatively modest price. See, for example, U.S. Pat. No. 4,936,661, granted to Betensky et al Jun. 26, 1990; U.S. Pat. No. 5,087,988 to Nakayama, granted Feb. 11, 1992; U.S. Pat. Nos. 5,270,861 and 5,270,867, both issued Dec. 14, 1993, to L. R. Estelle. These documents disclose compact zoom camera lenses with as few as three or four elements arranged in as few as two moving components.

SUMMARY OF THE INVENTION

It is an object of the invention to provide a zoom camera lens sufficiently simple that it can be used on a very inexpensive camera, for example, a single use camera.

These and other objects are accomplished by a zoom camera lens having a positive and a negative element, both of which are plastic. The positive element is located between the negative element and a stop and both elements are meniscus, concave to the stop. Both the focal length $f_W$ of the lens at the wide angle position divided by the absolute value of the focal length $f_N$ of the negative element and the focal length of the positive element $f_P$ divided by the focal length $f_W$ of the lens at its wide angle position are between 0.5 and 1.05.

According to a preferred embodiment, both elements are made of plastic and the lens is designed with a curved image plane. Although fixed focal length lenses with curved image planes are known (see, for example, U.S. Pat. No. 4,932,764, issued to Simpson Jun. 12, 1990), they are not common in a zoom lens. However, this feature provides an increased MTF in a plastic, two element zoom lens. Preferably, the image plane has a radius of curvature, on axis, of not more than 500 mm.

According to a further preferred embodiment, one or more of the four surfaces is aspheric which also improves performance.

Lenses constructed according to the preferred embodiment are reasonably corrected for inexpensive cameras of the 35 mm format at modest apertures (for example, f/11 in the wide angle position). More specifically, they provide an area weighted average MTF greater than 80 at four lines per mm and greater than 50 at 10 lines per mm. With a curved image plane and one or more aspheric surfaces, MTF's greater than 65 and 70 at 10 lines per mm are attainable throughout a 1.4 to 1 zoom range.

DESCRIPTION OF THE PREFERRED EMBODIMENTS

Figure 1:
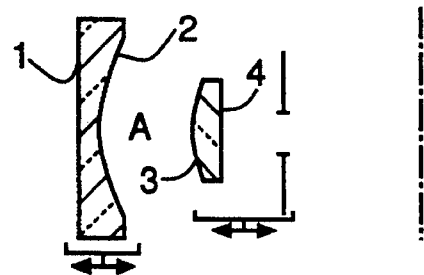
FIGS. 1–4 are top cross-section schematics of alternative zoom camera lenses.
Figure 2:
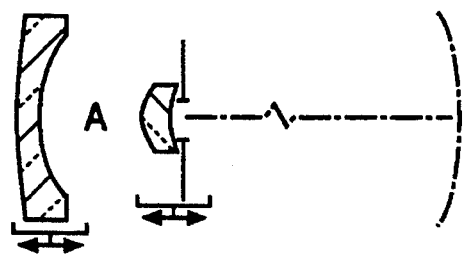
Figure 3:
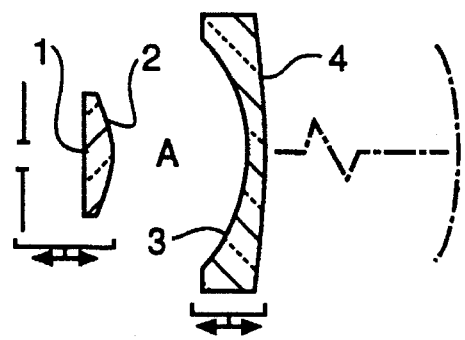
Figure 4:
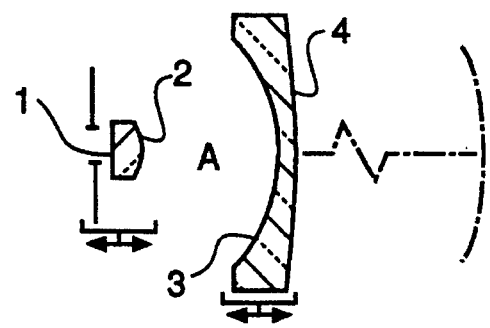

In each of the following examples, dimensions are in mm and indices and dispersions (V) are for the e line of the spectrum. The surfaces are numbered from the object (long conjugate) side.

EXAMPLE 1 (FIG. 1)

| SURFACE | RADIUS | THICKNESS | INDEX | V |
|---|---|---|---|---|
| 1 | 163.530 | 2.000 | 1.492 | 57.4 |
| 2 | ASPHERE | A | | |
| 3 | 9.17500 | 2.370 | 1.492 | 57.4 |
| 4 | ASPHERE | 5.650 | | |
| | DIAPHRAGM | | | |

ASPHERIC EQUATION:

$$X = \frac{CY^2}{1+\sqrt{1-(K+1)C^2Y^2}} + DY^4 + EY^6 + FY^8 + GY^{10}$$

| | | | | | | |
|---|---|---|---|---|---|---|
| SURF. 2 | C = | 0.0636092 | D = | 0.262E-05 | F = | 0.0 |
| | K = | 0.091 | E = | −0.357E-07 | G = | 0.0 |
| SURF. 4 | C = | 0.0240442 | D = | 0.319E-04 | F = | 0.341E-07 |
| | K = | 0.0 | E = | −0.719E-06 | G = | −0.757E-09 |

| FOCAL LENGTH | BACK FOCUS | FRONT FOCUS | ZOOM SPACING (A) | LENS LENGTH | STOP DIAMETER | RELATIVE APERTURE |
|---|---|---|---|---|---|---|
| 49.98 | 54.17 | 39.10 | 4.956 | 9.326 | 3.53 | 13.75 |
| 41.80 | 48.79 | 26.67 | 8.180 | 12.550 | 3.51 | 12.30 |
| 35.01 | 44.33 | 16.35 | 12.000 | 16.370 | 3.52 | 11.00 |

Example 1 has a flat field with a semi-field that varies from 23.40° to 32.60°, with a semi-diagonal of 21.63. All refractive surfaces are convex to the front and concave to the rear stop. The front negative element has a focal length of −35.38, making the ratio of the wide angle focal length of the lens (35.01) to the absolute focal length of the negative element equal to 0.99. The rear positive element has a focal length of 23.27, making the ratio of its focal length to the wide angle focal length of the lens equal to 0.66.

EXAMPLE 2 (FIG. 2)

| SURFACE | RADIUS | THICKNESS | INDEX | V |
| --- | --- | --- | --- | --- |
| 1 | 44.0730 | 2.000 | 1.492 | 57.4 |
| 2 | ASPHERE | A | | |
| 3 | ASPHERE | 2.665 | 1.492 | 57.4 |
| 4 | ASPHERE | 1.000 | | |
|   | DIAPHRAGM | | | |

ASPHERIC EQUATION:

$$X = \frac{CY^2}{1 + \sqrt{1 - (K+1)C^2Y^2}} + DY^4 + EY^6 + FY^8$$

| | | | | | |
| --- | --- | --- | --- | --- | --- |
| SURF. 2 | C = 0.0753239 | D = 0.2664E-04 | F = | 0.0 | |
|   | K = 0.0 | E = −0.1178E-06 | | | |
| SURF. 3 | C = 0.2053810 | D = 0.3106E-03 | F = | 0.0 | |
|   | K = 0.0 | E = 0.7509E-04 | | | |
| SURF. 4 | C = 0.1434720 | D = 0.1902E-02 | F = | −0.5487E-04 | |
|   | K = −1.505 | E = 0.5799E-03 | | | |

| FOCAL LENGTH | BACK FOCUS | FRONT FOCUS | ZOOM SPACING (A) | LENS LENGTH | STOP DIAMETER | RELATIVE APERTURE |
| --- | --- | --- | --- | --- | --- | --- |
| 49.91 | 48.15 | 43.84 | 5.407 | 10.072 | 3.50 | 13.48 |
| 41.79 | 43.40 | 29.99 | 8.939 | 13.604 | 3.50 | 12.13 |
| 35.06 | 39.45 | 18.50 | 13.108 | 17.773 | 3.50 | 11.00 |

Example 2 has a curved field with a radius of −459.6. The semi-field varies from 23.20° to 32.00° with a semi-diagonal of 21.63. The image plane is concave to the front while all refractive surfaces are concave to the rear stop. The front negative element has a focal length of −39.34, making the ratio of the wide angle focal length of the lens (35.06) to the absolute focal length of the negative element equal to 0.89. The rear positive element has a focal length of 23.07, making the ratio of its focal length to the wide angle focal length of the lens equal to 0.65.

Example 3 has a curved field with a radius of −215. Its semi-field varies from 24.18° to 32.54° with a semi-diagonal of 21.63. The image plane and all of the refractive surfaces are negatively curved, that is, they are convex to the rear and concave to the front stop. This is the only lens with a high dispersion material in any element. Although its performance (as measured by its MTF) across the zoom range varies more than Example 4 below, it is virtually as good with only one aspheric surface. The rear negative element has a focal length of −39.18, making the ratio of the wide angle focal length of the lens (34.79) to its absolute value equal to 0.89. The front positive element has a focal length of 28.29, making the ratio of it to the wide angle focal length of the lens equal to 0.81.

EXAMPLE 3 (FIG. 3)

| SURFACE | RADIUS | THICKNESS | INDEX | V |
| --- | --- | --- | --- | --- |
|   | DIAPHRAGM | 7.223 | | |
| 1 | −123.036 | 3.000 | 1.492 | 57.4 |
| 2 | −12.6441 | A | | |
| 3 | −18.1159 | 2.000 | 1.590 | 30.9 |
| 4 | ASPHERE | | | |

ASPHERIC EQUATION:

$$X = \frac{CY^2}{1 + \sqrt{1 - (K+1)C^2Y^2}}$$

C = −0.0118146
K = −34.6785420
VERTEX RADIUS = −84.6409

| FOCAL LENGTH | BACK FOCUS | FRONT FOCUS | ZOOM SPACING (A) | LENS LENGTH | STOP DIAMETER | RELATIVE APERTURE |
| --- | --- | --- | --- | --- | --- | --- |
| 34.98 | 7.67 | 51.32 | 21.357 | 26.357 | 3.18 | 11.00 |
| 42.02 | 17.42 | 56.41 | 16.050 | 21.050 | 3.18 | 13.22 |
| 49.97 | 28.42 | 62.14 | 11.859 | 16.859 | 3.18 | 15.71 |

EXAMPLE 4 (FIG. 4)

| SURFACE | RADIUS | THICKNESS | INDEX | V |
|---|---|---|---|---|
| 1 | ASPHERE | 3.300 | 1.492 | 57.4 |
| 2 | ASPHERE | A | | |
| 3 | ASPHERE | 2.000 | 1.492 | 57.4 |
| 4 | −100.678 | | | |

ASPHERIC EQUATION:

$$X = \frac{CY^2}{1 + \sqrt{1-(K+1)C^2Y^2}} + DY^4 + EY^6 + FY^8$$

SURF. 1
C = −0.0965714   D = −0.6108431E-02   F = −0.1124789E-03
K = −46.9292770   E = 0.8978951E-03
VERTEX RADIUS = −10.3550

SURF. 2
C = −0.1479946   D = −0.3201587E-03   F = 0.0000000E+00
K = 0.0000000   E = −0.1153188E-04
VERTEX RADIUS = −6.7570

SURF. 3
C = −0.0446193   D = −0.2055898E-04   F = 0.0000000E+00
K = 0.0000000   E = −0.5733013E-07
VERTEX RADIUS = −22.4118

| FOCAL LENGTH | BACK FOCUS | FRONT FOCUS | ZOOM SPACING (A) | LENS LENGTH | STOP DIAMETER | RELATIVE APERTURE |
|---|---|---|---|---|---|---|
| 35.00 | 7.57 | 43.31 | 25.751 | 31.051 | 3.18 | 11.00 |
| 42.65 | 22.49 | 47.23 | 16.628 | 21.928 | 3.18 | 13.40 |
| 49.97 | 36.74 | 50.99 | 10.522 | 15.822 | 3.18 | 15.70 |

Example 4 has a curved field with a radius of curvature of −370. All of the surfaces have negative curvature, that is, they are convex to the rear or image side of the lens. The rear negative element has a focal length of −58.88, making the ratio of the wide angle focal length of the lens (35.00) to its absolute value equal to 0.60. The front positive element has a focal length of 30.22, making the ratio of it to the wide angle focal length of the lens equal to 0.86.

The following MTF data is taken at the best focus, using specifically weighted wavelengths. The wavelengths are (in microns) 0.5461, 0.4861 and 0.6563 and are weighted 0.5, 0.15 and 0.35, respectively. For Examples 2–4 the best focus value refers to a cylindrically curved image. Where two values are given, separated by a slash, they are for the tangential and sagittal rays, respectively. Percentages are of the field. L/MM is lines per mm and AWA is the area weighted average MTF. The area weighted averages are calculated by computing the weighted sum of the MTF of the field points 0, 40%, 60%, 75% and 90% using the respective weights 0.15; 0.26; 0.33; 0.18 and 0.08.

| FOCAL LENGTH | L/MM | AXIS | 40% | 60% | 75% | 90% | AWA |
|---|---|---|---|---|---|---|---|
| | | | MTF - Example 1 | | | | |
| 50 | 4 | 89 | 90/90 | 91/89 | 88/86 | 83/84 | 89 |
| 42 | 4 | 90 | 91/91 | 91/89 | 87/86 | 80/80 | 89 |
| 35 | 4 | 88 | 91/89 | 91/90 | 89/88 | 83/82 | 89 |
| 50 | 10 | 54 | 62/60 | 67/62 | 61/56 | 51/52 | 60 |
| 42 | 10 | 57 | 65/63 | 66/62 | 58/56 | 45/46 | 60 |
| 35 | 10 | 50 | 60/55 | 65/60 | 62/60 | 49/51 | 58 |
| | | | MTF - Example 2 | | | | |
| 50 | 4 | 91 | 88/90 | 87/90 | 87/90 | 87/89 | 89 |
| 42 | 4 | 92 | 90/91 | 90/91 | 89/91 | 89/91 | 91 |
| 35 | 4 | 93 | 93/95 | 88/92 | 87/91 | 84/91 | 91 |
| 50 | 10 | 69 | 65/67 | 64/67 | 63/68 | 61/67 | 66 |
| 42 | 10 | 71 | 68/70 | 68/70 | 68/70 | 67/70 | 69 |
| 35 | 10 | 75 | 62/73 | 58/71 | 59/68 | 52/69 | 66 |
| | | | MTF - Example 3 | | | | |
| 50 | 4 | 94 | 90/93 | 85/92 | 80/91 | 72/89 | 89 |
| 42 | 4 | 94 | 93/94 | 90/93 | 86/92 | 79/89 | 91 |
| 35 | 4 | 95 | 93/94 | 92/93 | 91/93 | 89/90 | 93 |
| 50 | 10 | 80 | 70/79 | 58/76 | 50/73 | 40/67 | 69 |
| 42 | 10 | 80 | 77/79 | 70/77 | 63/74 | 50/66 | 73 |
| 35 | 10 | 81 | 77/81 | 74/79 | 73/76 | 68/67 | 77 |

-continued

| FOCAL LENGTH | L/MM | AXIS | 40% | 60% | 75% | 90% | AWA |
|---|---|---|---|---|---|---|---|
| | | | MTF - Example 4 | | | | |
| 50 | 4 | 92 | 91/92 | 91/91 | 90/91 | 90/90 | 91 |
| 43 | 4 | 93 | 92/92 | 91/92 | 91/91 | 90/90 | 92 |
| 35 | 4 | 94 | 92/93 | 91/92 | 90/92 | 88/91 | 92 |
| 50 | 10 | 73 | 73/73 | 71/72 | 70/71 | 69/70 | 72 |
| 43 | 10 | 75 | 74/75 | 72/73 | 70/72 | 68/71 | 73 |
| 35 | 10 | 78 | 74/77 | 71/74 | 69/73 | 64/72 | 74 |

Note that Examples 2–4 all have curved image planes. These lenses provide somewhat better MTF's than does a lens constructed according to Example 1. This is especially true when used with film having a relatively high aspect ratio. For example, for use of Examples 2–4 in the traditional 35 mm format, the film is curved in the format's longest dimension to match the image plane.

Note that except for Example 3, all examples use the same material, that is methyl acrylate, having an index of 1.492 and a abbe V number of 57.4. This means that color correction is somewhat limited. However, at f/11, as shown by the MTF values, performance is still good. Example 3 includes a negative element made of a conventional styrene optical material having a higher dispersion which allows color correction. The negative element has an Abbe V number less than 40, specifically 30.9. Its performance with a single asphere compares with Example 4, for example, which has three aspheres and uses methyl acrylate in both elements.

The invention has been described in detail with particular reference to preferred embodiments thereof, but it will be understood that variations and modifications can be effected within the spirit and scope of the invention as described hereinabove and as defined in the appended claims.

We claim:

1. A zoom camera lens for forming an image of a scene at an image plane consisting of a plastic negative power element, a plastic positive power element and a stop, in which both elements are movable with respect to each other and the image to vary focal length without varying the position of the image, in which the positive element is positioned between the negative plastic element and the stop, each element has two surfaces which are concave to the stop and the lens complies with the following inequalities:

$0.5 < f_W/f_N < 1.05$; and $0.5 < f_P/f_W < 1.05$ where $f_W$ is the focal length of the lens at its wide angle position, $f_N$ and $f_P$ are the absolute values of the focal length of the negative element and of the positive element, respectively.

2. The zoom camera lens according to claim 1 wherein the negative element is between the positive element and the image.

3. The zoom camera lens according to claim 1 wherein the positive element is between the negative element and the image.

4. The zoom camera lens according to claim 1 having an image field which is curved.

5. The zoom camera lens according to claim 4 wherein the image field has a radius of curvature less than 500 mm.

6. The zoom camera lens according to claim 1 having at least one aspheric surface.

7. The zoom camera lens according to claim 6 wherein the aspheric surface is on the surface closest to the image.

8. The zoom camera lens according to claim 6 having at least three aspheric surfaces.

9. The zoom camera lens according to claim 8 wherein the aspheric surfaces are on the three surfaces closest to the image and the positive element is between the negative element and the image plane.

10. The zoom camera lens according to claim 6 wherein the two elements are made of a same material.

11. The zoom camera lens according to claim 10 wherein the material is methyl acrylate.

12. The zoom camera lens according to claim 6 wherein the positive element is made of methyl acrylate and the negative element is made of a material having an Abbe V number less than 40.

13. The zoom camera lens according to claim 1 wherein an area weighted average MTF of the lens at 10 lines per mm is in excess of 50 across a zoom range of at least 1.4 to 1.

14. The zoom camera lens according to claim 11 wherein said area weighted average is above 65 across a 1.4 to 1 zoom range.

15. The zoom camera lens according to claim 1 and constructed according to the following chart, wherein the surfaces are numbered from an object side to an image side, all distances are in millimeters, V is the abbe number, index is the index of refraction, and both V and the index are for the e line of the spectrum:

| SURFACE | RADIUS | THICKNESS | INDEX | V |
|---|---|---|---|---|
| 1 | 163.530 | 2.000 | 1.492 | 57.4 |
| 2 | ASPHERE | A | | |
| 3 | 9.17500 | 2.370 | 1.492 | 57.4 |
| 4 | ASPHERE | 5.650 | | |
| | DIAPHRAGM | | | |

ASPHERIC EQUATION:

$$X = \frac{CY^2}{1 + \sqrt{1-(K+1)C^2Y^2}} + DY^4 + EY^6 + FY^8 + GY^{10}$$

| | | | | | |
|---|---|---|---|---|---|
| SURF. 2 | C = | 0.0636092 | D = | 0.262E-05 | F = 0.0 |
| | K = | 0.091 | E = | −0.357E-07 | G = 0.0 |
| SURF. 4 | C = | 0.0240442 | D = | 0.319E-04 | F = 0.341E-07 |
| | K = | 0.0 | E = | −0.719E-06 | G = −0.757E-09 |

| FOCAL LENGTH | BACK FOCUS | FRONT FOCUS | ZOOM SPACING (A) | LENS LENGTH | STOP DIAMETER | RELATIVE APERTURE |
|---|---|---|---|---|---|---|
| 49.98 | 54.17 | 39.10 | 4.956 | 9.326 | 3.53 | 13.75 |
| 41.80 | 48.79 | 26.67 | 8.180 | 12.550 | 3.51 | 12.30 |
| 35.01 | 44.33 | 16.35 | 12.000 | 16.370 | 3.52 | 11.00 |

16. The zoom camera lens according to claim 1 and constructed according to the following chart, wherein the surfaces are numbered from an object side to an image side, all distances are in millimeters, V is the abbe number, index is the index of refraction, and both V and the index are for the e line of the spectrum:

| SURFACE | RADIUS | THICKNESS | INDEX | V |
|---|---|---|---|---|
| 1 | 44.0730 | 2.000 | 1.492 | 57.4 |
| 2 | ASPHERE | A | | |
| 3 | ASPHERE | 2.665 | 1.492 | 57.4 |
| 4 | ASPHERE | 1.000 | | |
| | DIAPHRAGM | | | |

ASPHERIC EQUATION:

$$X = \frac{CY^2}{1 + \sqrt{1-(K+1)C^2Y^2}} + DY^4 + EY^6 + FY^8$$

| | | | | | |
|---|---|---|---|---|---|
| SURF. 2 | C = | 0.0753239 | D = | 0.2664E-04 | F = 0.0 |
| | K = | 0.0 | E = | −0.1178E-06 | |
| SURF. 3 | C = | 0.2053810 | D = | 0.3106E-03 | F = 0.0 |
| | K = | 0.0 | E = | 0.7509E-04 | |
| SURF. 4 | C = | 0.1434720 | D = | 0.1902E-02 | F = −0.5487E-04 |
| | K = | −1.505 | E = | 0.5799E-03 | |

| FOCAL LENGTH | BACK FOCUS | FRONT FOCUS | ZOOM SPACING (A) | LENS LENGTH | STOP DIAMETER | RELATIVE APERTURE |
|---|---|---|---|---|---|---|
| 49.91 | 48.15 | 43.84 | 5.407 | 10.072 | 3.50 | 13.48 |
| 41.79 | 43.40 | 29.99 | 8.939 | 13.604 | 3.50 | 12.13 |
| 35.06 | 39.45 | 18.50 | 13.108 | 17.773 | 3.50 | 11.00 |

17. The zoom camera lens according to claim 1 and constructed according to the following chart, wherein the surfaces are numbered from an object side to an image side, all distances are in millimeters, V is the abbe number, index is the index of refraction, and both V and the index are for the e line of the spectrum:

| SURFACE | RADIUS | THICKNESS | INDEX | V |
|---|---|---|---|---|
| | DIAPHRAGM | 7.223 | | |
| 1 | −123.036 | 3.000 | 1.492 | 57.4 |
| 2 | −12.6441 | A | | |
| 3 | −18.1159 | 2.000 | 1.590 | 30.9 |
| 4 | ASPHERE | | | |

ASPHERIC EQUATION:

$$X = \frac{CY^2}{1 + \sqrt{1-(K+1)C^2Y^2}}$$

-continued

|  |  |  | C = −0.0118146<br>K = −34.6785420<br>VERTEX RADIUS = −84.6409 |  |  |  |
|---|---|---|---|---|---|---|
| FOCAL<br>LENGTH | BACK<br>FOCUS | FRONT<br>FOCUS | ZOOM<br>SPACING<br>(A) | LENS<br>LENGTH | STOP<br>DIAMETER | RELATIVE<br>APERTURE |
| 34.98 | 7.67 | 51.32 | 21.357 | 26.357 | 3.18 | 11.00 |
| 42.02 | 17.42 | 56.41 | 16.050 | 21.050 | 3.18 | 13.22 |
| 49.97 | 28.42 | 62.14 | 11.859 | 16.859 | 3.18 | 15.71 |

18. The zoom camera lens according to claim 1 and constructed according to the following chart, wherein the surfaces are numbered from an object side to an image side, all distances are in millimeters, V is the abbe number, index is the index of refraction, and both V and the index are for the e line of the spectrum:

| SURFACE | RADIUS | THICKNESS | INDEX | V |
|---|---|---|---|---|
| 1 | ASPHERE | 3.300 | 1.492 | 57.4 |
| 2 | ASPHERE | A |  |  |
| 3 | ASPHERE | 2.000 | 1.492 | 57.4 |
| 4 | −100.678 |  |  |  |

ASPHERIC EQUATION:

$$X = \frac{CY^2}{1 + \sqrt{1-(K+1)C^2Y^2}} + DY^4 + EY^6 + FY^8$$

| SURF. 1 |  | C = | −0.0965714 | D = | −0.6108431E-02 | F = | −0.1124789E-03 |
|---|---|---|---|---|---|---|---|
|  |  | K = | −46.9292770 | E = | 0.8978951E-03 |  |  |
| VERTEX RADIUS = |  |  | −10.3550 |  |  |  |  |
| SURF. 2 |  | C = | −0.1479946 | D = | −0.3201587E-03 | F = | 0.0000000E+00 |
|  |  | K = | 0.0000000 | E = | −0.1153188E-04 |  |  |
| VERTEX RADIUS = |  |  | −6.7570 |  |  |  |  |
| SURF. 3 |  | C = | −0.0446193 | D = | −0.2055898E-04 | F = | 0.0000000E+00 |
|  |  | K = | 0.0000000 | E = | −0.5733013E-07 |  |  |
| VERTEX RADIUS = |  |  | −22.4118 |  |  |  |  |

| FOCAL<br>LENGTH | BACK<br>FOCUS | FRONT<br>FOCUS | ZOOM<br>SPACING<br>(A) | LENS<br>LENGTH | STOP<br>DIAMETER | RELATIVE<br>APERTURE |
|---|---|---|---|---|---|---|
| 35.00 | 7.57 | 43.31 | 25.751 | 31.051 | 3.18 | 11.00 |
| 42.65 | 22.49 | 47.23 | 16.628 | 21.928 | 3.18 | 13.40 |
| 49.97 | 36.74 | 50.99 | 10.522 | 15.822 | 3.18 | 15.70 |

\* \* \* \* \*